United States Patent
Arnold et al.

(10) Patent No.: US 7,441,048 B2
(45) Date of Patent: Oct. 21, 2008

(54) COMMUNICATIONS SYSTEM AND METHOD FOR SYNCHRONIZING A COMMUNICATIONS CYCLE

(75) Inventors: Johann Arnold, Wendelstein (DE); Herbert Bernecker, Heilsbronn (DE); Dieter Brückner, Unterleiterbach (DE); Franz-Josef Götz, Heideck (DE); Dieter Klotz, Fürth (DE); Karl-Heinz Krause, Nürnberg (DE); Christiane Müller, Baiersdorf (DE); Gerhard Scheithauer, Erlangen (DE); Jürgen Schimmer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 752 days.

(21) Appl. No.: 10/491,074

(22) PCT Filed: Sep. 13, 2002

(86) PCT No.: PCT/DE02/03437

§ 371 (c)(1),
(2), (4) Date: Mar. 26, 2004

(87) PCT Pub. No.: WO03/028259

PCT Pub. Date: Apr. 3, 2003

(65) Prior Publication Data

US 2004/0249982 A1    Dec. 9, 2004

(30) Foreign Application Priority Data

Sep. 26, 2001    (DE) ............................. 101 47 422

(51) Int. Cl.
*G06F 15/16* (2006.01)
*H04J 3/06* (2006.01)

(52) U.S. Cl. ................ 709/248; 370/503; 713/375
(58) Field of Classification Search ................ 709/248; 713/375; 370/503
See application file for complete search history.

(56) References Cited

U.S. PATENT DOCUMENTS

| | | | | |
|---|---|---|---|---|
| 5,907,685 | A * | 5/1999 | Douceur | 709/248 |
| 6,042,477 | A | 3/2000 | Addink | |
| 6,128,318 | A * | 10/2000 | Sato | 370/503 |
| 6,199,169 | B1 | 3/2001 | Voth | |
| 6,335,931 | B1 * | 1/2002 | Strong et al. | 370/390 |
| 6,687,756 | B1 * | 2/2004 | Rawson, III | 709/248 |
| 6,816,510 | B1 * | 11/2004 | Banerjee | 370/503 |

FOREIGN PATENT DOCUMENTS

| | | |
|---|---|---|
| DE | 199 17 354 A1 | 10/2000 |
| DE | 199 43 779 A1 | 3/2001 |
| DE | 100 07 070 A1 | 8/2001 |
| EP | 0 991 216 A2 | 4/2000 |

* cited by examiner

*Primary Examiner*—Saleh Najjar
*Assistant Examiner*—Farzana Huq

(57) ABSTRACT

The invention relates to a method for synchronizing a communications cycle and a communications node in a network. The node is formed with devices for receiving a desired value for a time base of a communications cycle of the communications node in a communications link to an additional communications node of the network. The node also includes devices for determining a system deviation between the desired value and an actual value of the time base, and a device for generating a manipulated variable for correcting the time base in accordance with the system deviation.

19 Claims, 4 Drawing Sheets

COMMUNICATIONS SYSTEM AND METHOD FOR SYNCHRONIZING A COMMUNICATIONS CYCLE

CROSS REFERENCE TO RELATED APPLICATIONS

This application is the US National Stage of International Application No. PCT/DE02/03437, filed Sep. 13, 2002 and claims the benefit thereof. The International Application claims the benefits of German application No. 10147422.9 filed Sep. 26, 2001, both applications are incorporated by reference herein in their entirety.

FIELD OF INVENTION

The invention relates to a communication system and method for synchronization of a communication cycle, especially for use in automation systems.

BACKGROUND OF INVENTION

Various methods and systems for establishing communication connections between the subscribers of a data network are known from the prior art. Bus systems by which every subscriber can directly address every other subscriber of the data network are in widespread use. Furthermore switchable data networks are known in which what are referred to as point-to-point connections can be established, i.e. a subscriber can only reach all other subscribers of the switchable data network indirectly, by corresponding forwarding of the data to be transmitted by means of one or more coupling units.

Data networks allow communication between a number of subscribers by networking, that is connecting the individual subscribers to each other. Communication here means the transmission of data between the subscribers. The data to be transmitted is sent in this case as data telegrams, i.e. the data is packed into a number of packets and sent in this form over the data network to the corresponding recipient. The term data packet is thus used. The term transmission of data is used in this document fully synonymously with the above-mentioned transmission of data telegrams or data packets.

Networking itself for example is implemented in switchable high performance data networks, especially Ethernet, by connecting at least one coupling unit between two subscribers in each case, which is connected to both subscribers. Each coupling unit can be connected to more than two subscribers. Each subscriber is connected to at least one coupling unit but not directly to another subscriber. Subscribers are for example computers, Programmable Logic Controllers (PLC) or other machines which exchange electronic data with other machines and especially process it.

In distributed automation systems, for example in the area of drive technology, specific data must arrive at specific times at the intended subscribers and must be processed by the recipients. This is referred to as realtime-critical data or real-time-critical data traffic since, if the data does not arrive at its intended destination at the right time this can produce undesired results at the subscriber. In accordance with the IEC 61491, EN61491 SERCOS interface—Brief Technical Description in German (http://www.sercos.de/deutsch/index deutsch.htm) successful realtime critical data traffic of the type mentioned can be guaranteed in distributed automation systems.

Likewise the use of a synchronous, clocked communication system with equidistance characteristics is known per se in such an automation system. This is taken to mean a system consisting of at least two subscribers that are linked via a data network for the purposes of mutual exchange of data or mutual transmission of data.

In this case data is exchanged cyclically in equidistant communication cycles which are specified by the communication clock used by the system. Subscribers are for example central automation devices, programming, project planning or operating devices, peripheral devices such as input/output modules, drives, actors, sensors, Programmable Logic Controllers (PLC) or other control units, computers or machines which exchange electronic data with other machines and process data, especially from other machines. In this document control units are taken to mean closed-loop controllers or control units of all types. Typical examples of data networks used are bus systems such as Field Bus, Profibus, Ethernet, Industrial Ethernet, FireWire or also PC-internal bus systems (PCI), etc.

Automation components (e.g. controllers, drives, . . . ) nowadays generally have an interface to a cyclically clocked communication system. A run level of the automation components (fast-cycle) (e.g. positional control in a controller, torque control of the drive) is synchronized to the communication cycle. This defines the communication timing. Other lower-performance algorithms (slow-cycle) (e.g. temperature controllers) of the automation components can also only communicate via this communication clock with other components (e.g. binary switches for fans, pumps, . . . ), although a slower cycle would be adequate. Using only one communication clock for transmission of all information in the system produces high demands on the bandwidth of the transmission link.

For use in automation systems in particular, PROFIBUS as well as PROFInet are known from the prior art. You can find technical information about these systems at www.profibus-.com. In Profibus networks the synchronization of the communication cycles, i.e. what are referred to as the isochronous cycles, are entirely hardware implemented using a Phase Locked Loop (PLL). This is possible since the Profibus topologies have underlying bus structures. Setting up point-to-point connections with such systems is not possible, especially not in an Ethernet-based network. The PLL realized in the hardware of a Profibus system leads to oscillation effects in an Ethernet network.

SUMMARY OF INVENTION

The object of the invention is thus to create an improved method for synchronization of a communication cycle, an improved communication node and also an improved communication system and automation system and a corresponding computer program product.

The invention allows point-to-point connections to be established between the nodes of an Ethernet network. The individual communication connections between the nodes in this case preferably run in communication cycles which are synchronized with each other. To synchronize the communication cycles a controller is provided in each of the nodes.

In accordance with a preferred embodiment of the invention, adjustment of a communication cycle is distributed uniformly over a communication cycle, i.e. distributed over the current communication cycle or over the subsequent communication cycle. The result that can be achieved is that the subordinate higher-frequency cycle within the isochronous cycle merely exhibits a jitter of a timer clock.

In accordance with a further preferred embodiment of the invention the desired value of the time base is provided in each of the nodes by a clock pulse generator. The clock pulse generator generates a data telegram at a specific node with the desired value of the time base of the node at the point of reception of the data telegram at the node by determining the desired value from the time base of the clock pulse generator, taking into account the delay time of the data telegram to the node.

BRIEF DESCRIPTION OF THE DRAWINGS

Preferred exemplary embodiments of the invention are explained in more detail below with reference to the drawings. The drawings show.

DETAILED DESCRIPTION OF INVENTION

Figure 1:
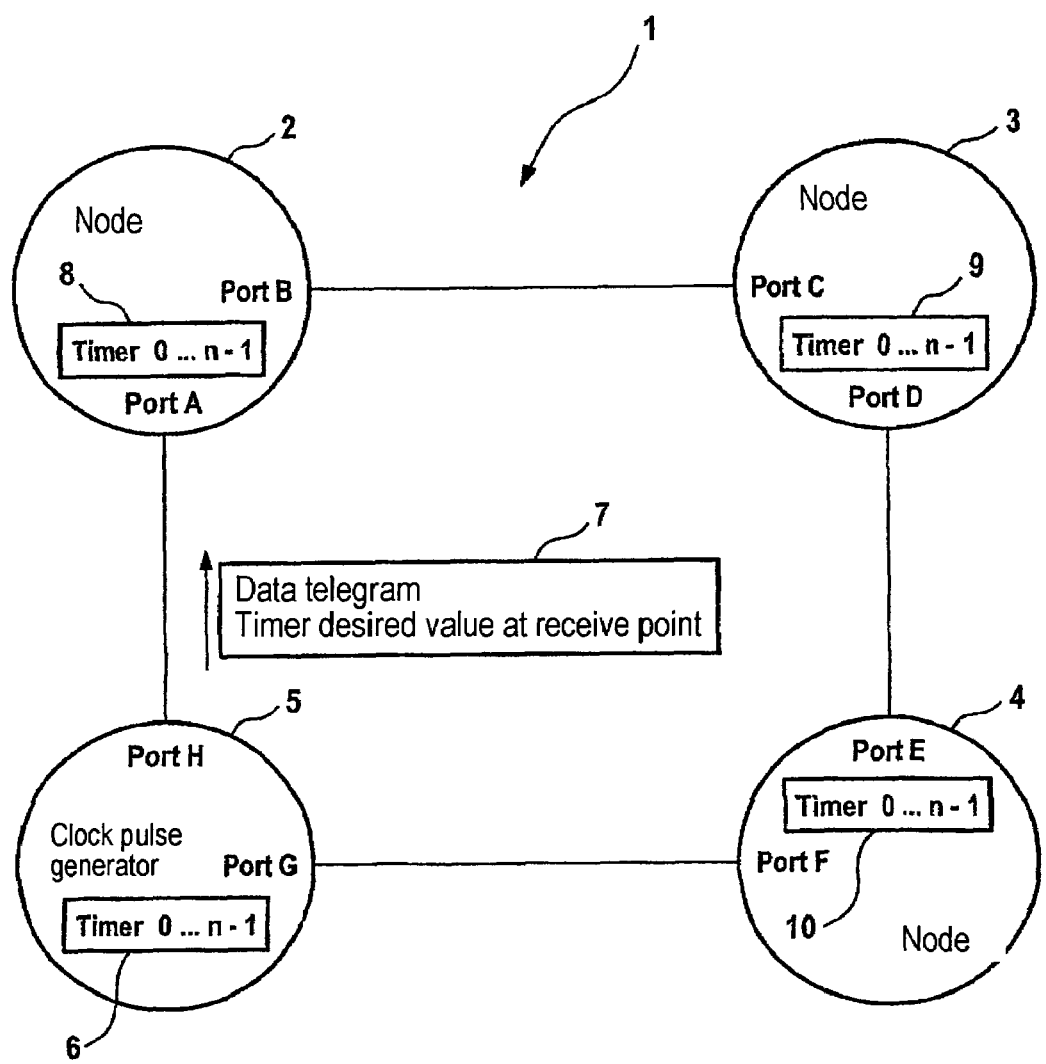
FIG. 1 a block diagram of an embodiment of a communication system in accordance with invention, FIG. 2 a block diagram of an embodiment of a communication node in accordance with the invention, FIG. 3 a flowchart of a preferred embodiment of a method in accordance with the invention for synchronization of communication cycles, FIG. 4 a signal diagram to illustrate the adjustment of the time base in a communication node.

FIG. 1 shows a network 1 with communication nodes 2, 3, 4 and 5. Communication node 5 is a clock generator node which provides the reference time base for synchronization of the time bases in the other nodes of network 1. The reference clock pulse generator time base of communication node 5 is generated by a timer 6 which, by timing with a local clock of communication node 5, constantly counts from 0 to n−1.

The communication node 5 is used to create a data telegram 7 for node 2. The data telegram 7 contains the desired value of the time base of node 2 at the point at which the data telegram is received.

The time base of node 2 is realized by a timer 8, which basically has the same structure as the timer 6 of the communication node 5. The timer 8 has its own local clock for timing of the counter of the timer which is independent of the clock of the communication node 5. When node 2 is switched on timer 8 is thus asynchronous with timer 6. After an initial synchronization an ongoing adjustment is necessary since the clock frequencies of the different clocks of the time bases are never exactly identical.

For synchronization of the time base of node 2, i.e. of its timer 8, communication node 5 generates data telegram 7. The data telegram 7 is sent from port H of communication node 5 to port A of communication node 2 via the corresponding network connection in network 1. In this way communication node 2 obtains the necessary desired value for adjusting its time base.

Accordingly communication nodes 3 and 4 also receive data telegrams 7 from communication node 5 for adjusting the corresponding timers 9 and 10.

After the synchronization of the time base in the individual nodes 2, 3 and 4 of the network 1 the communication cycles of point-to-point connections of the network 1 are asynchronous to each other. For example the communication node 2 can send one or more data telegrams to the communication node 3 during a communication cycle by using a point-to-point connection between port B of the communication node 2 and port C of the communication node 3.

Accordingly, data telegrams can also be received during the synchronized communication cycle from port C of communication node 3 to port B of communication node 2. The same applies correspondingly to communication between two different communication nodes which are linked to each other by a network connection of network 1.

When such a direct network connection does not exist a telecommunication connection it will be established via a switching matrix in the communication node. If for example the communication node 4 would like to send a data telegram to the communication node 2, this will be done so that communication node 4 initially sends the data telegram from its port E to the port D of communication node 3, from where it is forwarded via the switching matrix of communication node 3 to the port C, to be transmitted from there via the direct network connection point-to-point to the port B of communication node 2.

This process requires, especially for real-time capable packet data transmission in a deterministic communication system, as needed particularly for the purposes of automation technology, a synchronization of the communication cycles of the individual point-to-point connections in the network 1.

Figure 2:
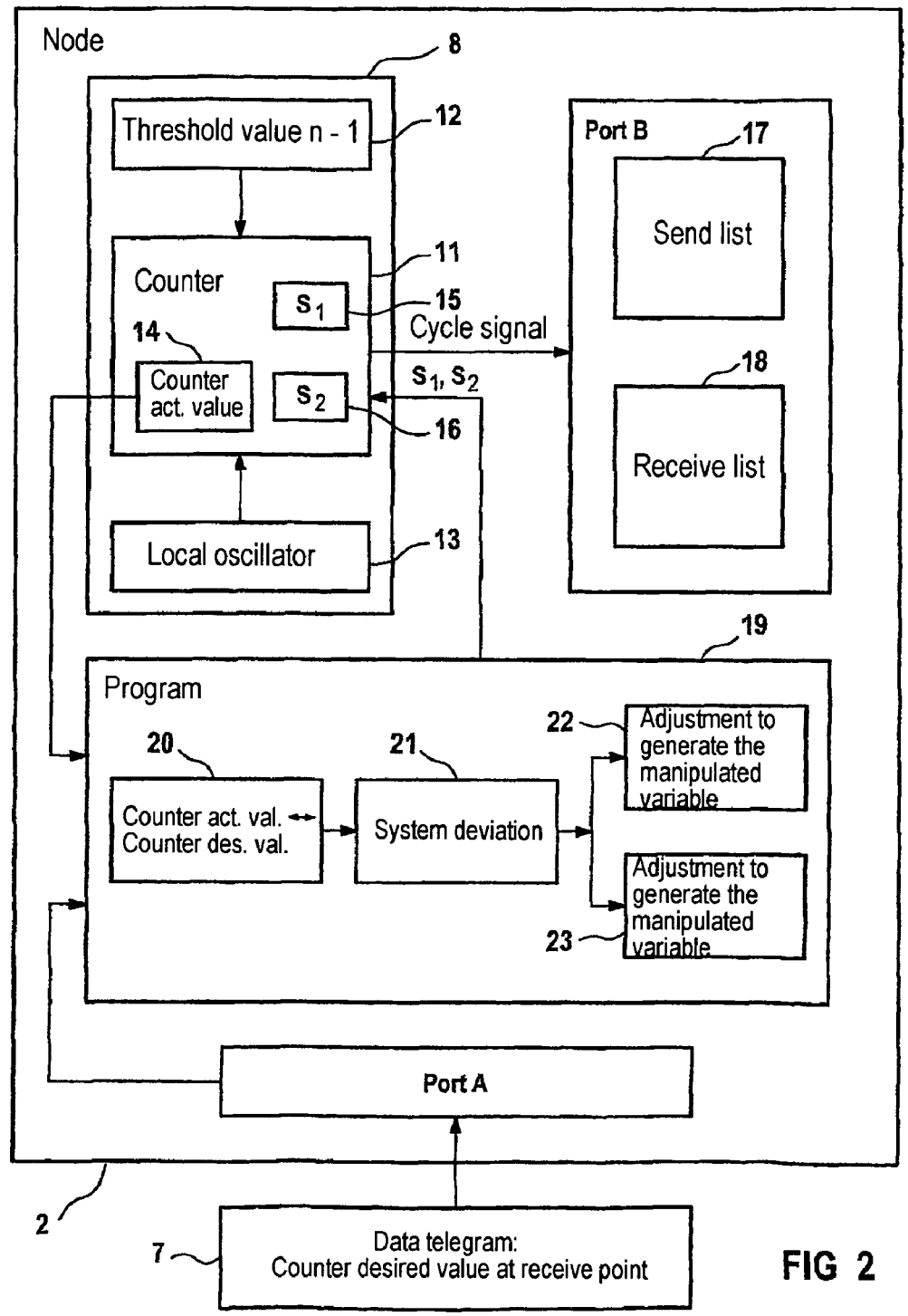

FIG. 2 shows a block diagram of communication node 2 of FIG. 1. Timer 8 of communication node 2 has a counter 11 which constantly counts from 0 to the threshold value n−1 in the threshold value register 12. The counter 11 is clocked by a local oscillator 13, that is by a clock.

The contents of the threshold value register 12, i.e. the parameter n, can be selected by a user. Selecting the parameter n defines the length of a communication cycle.

The counter 11 has a register 14 with the actual value of the counter. Furthermore the counter 11 has a register 15 and a register 16, each for storing a parameter S1 and S2 of the manipulated variables for adjusting counter 11 to synchronize the time base of the communication cycle.

When the threshold value specified by the contents of threshold value register 12 is reached, counter 11 issues a cycle signal which starts a transmission cycle. This cycle signal is issued for example to port B of communication node 2. Port B contains a send list 17 and a receive list 18. During a communication cycle both the send list 17 and also the receive list 18 are processed.

The communication node 2 also has a program 19. The program 19 has a program module 24 for entering the actual counter value of counter 11 and the desired counter value. Furthermore program 19 has a program module 21 for determining a system deviation by comparing the actual timer value and the desired timer value. Furthermore program 19 has program modules 22 and 23 each with an adjustment rule for creating a manipulated variable for controlling or adjusting the time base in accordance with the system deviation. The program module 22 is used here for controlling an initialization phase and program module 23 for adjustment during operation. Both program modules 22 and 23 generate the parameters S1 and S2 of the manipulated variable for the adjustment of the time base, i.e. of the timer 11 of timer 8.

At this input the program 19 receives the contents of register 14, i.e. the actual count of value and in addition it receives via a communication connection between communication node 2 and communication node 5 (cf. FIG. 1) the data telegram 7 (cf. likewise FIG. 1) via the port A of communication node 2.

During the initialization phase of node 2, i.e. during of the initial synchronization of the timer 11 which is running asynchronously the communication node 2 receives the data telegram 7 with the current desired timer value. This data telegram 7 will be received by the communication node 5, i.e. its port H at Port A of communication node 2 and forwarded from there to program 19.

Likewise in program 19 the actual counter value from register 14 is entered. From program module 20 the corresponding actual timer and threshold values are then forwarded to program module 21 to determine the system deviation.

To do this program module 21 accesses program module 22 during the initialization phase. This then generates the manipulated variable, i.e. the parameters S1 and S2 of the manipulated variable. These parameters will be written by program 19 into registers 15 or 16. This adjustment is preferably not effective until the cycle signal has been issued, i.e. for the subsequent communication cycle.

Parameter S1 specifies for such a subsequent communication cycle which of the clocks is to be influenced by the adjustment in the communication cycle. In this case for example this can involve a second, third or mth clock. Parameter S2 in register 16 by contrast specifies how to proceed with the clocks to be influenced. Preferably the contents of register 16 are either 0 or 2, i.e. an extension of the cycle is achieved by the timer 11 not being incremented for the clock concerned or a shortening of the cycle is achieved by the timer 11 being incremented by 2 at the clock concerned. It is not however mandatory for the adjustment by means of the parameters S1 and S2 to be undertaken in the very next communication cycle, it can also be undertaken in subsequent communication cycles.

After the initialization phase, i.e. after the initial synchronization of the timer 11 which is initially running fully asynchronously, the program module 21 selects program module 23 for the adjustment which then creates the parameters S1 and S2 in accordance with the adjustment rules applicable for the operating phase. By this method of adjustment the extension or shortening of the communications cycle are distributed uniformly over the clocks during a communication cycle.

In accordance with an alternative preferred embodiment the synchronization is undertaken during the initialization phase of the node not by adjustment, in which (as in operation) the number of clocks to be adjusted are uniformly distributed within the cycle. With the aid of a first synchronization telegram in the initialization phase the synchronization slave is by contrast first set "rigidly" to the value of the synchronization master.

This is advantageous, in order, with a max. adjustment difference of a half isochronous cycle, not to obtain any unnecessarily long synchronization times. This is especially necessary for networks with a number of nodes, since otherwise oscillation effects can occur in the network under some circumstances, which may possibly not allow any adjustment at all and thereby no synchronization.

Figure 3:
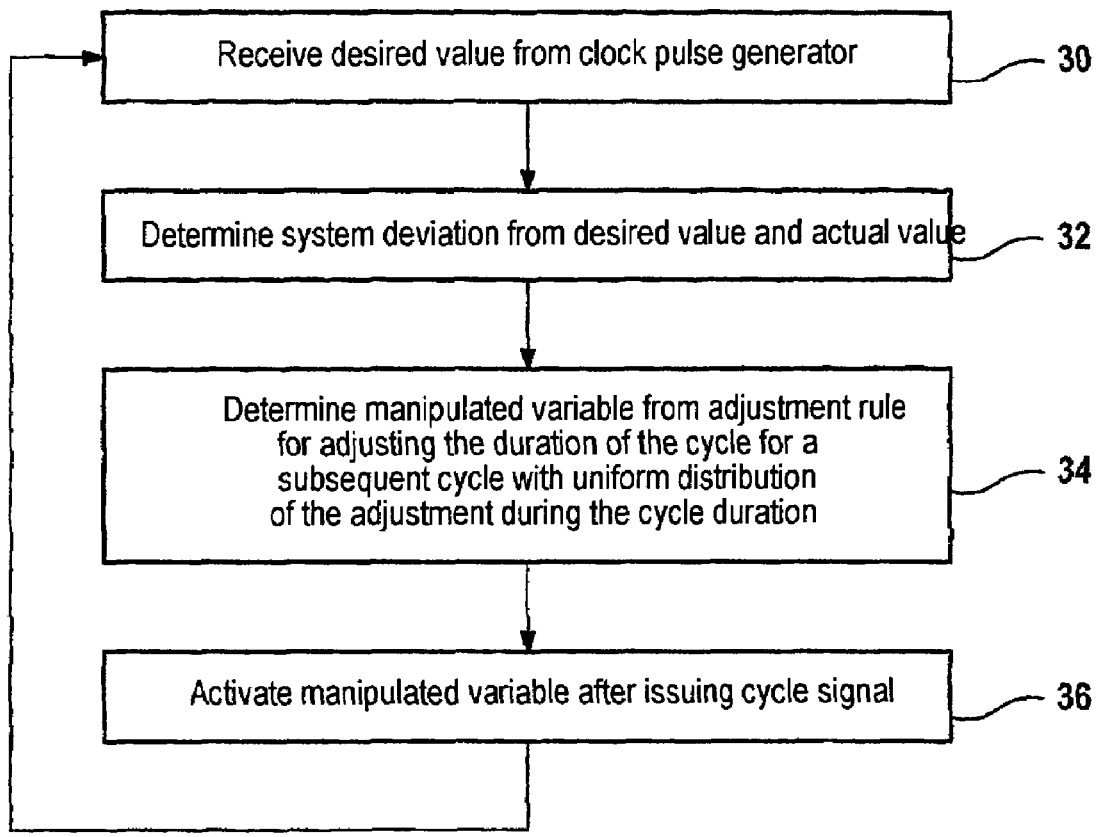

FIG. 3 shows a flowchart of an embodiment of the method in accordance with the invention. In step 30 a desired value of the time base of the relevant communication node is received from a clock pulse generator of the communication system. In step 32 a system deviation is determined from the difference between desired value and the actual timer value of the time base of the relevant communication node.

In step 34 a manipulated variable for adjusting the time base, that is the duration of a communication cycle, is determined by means of an adjustment rule from the system deviation. The manipulated variable is determined in such a way here that the adjustment of the duration of the subsequent communication cycle is distributed as uniformly as possible over the clocks of the communication cycle.

The actual adjustment of the communication cycle is undertaken in step 36 by activating the corresponding manipulated variables in the timer of the communications node concerned after issuing the cycle signal, i.e. at the beginning of the subsequent communication cycle.

Figure 4:
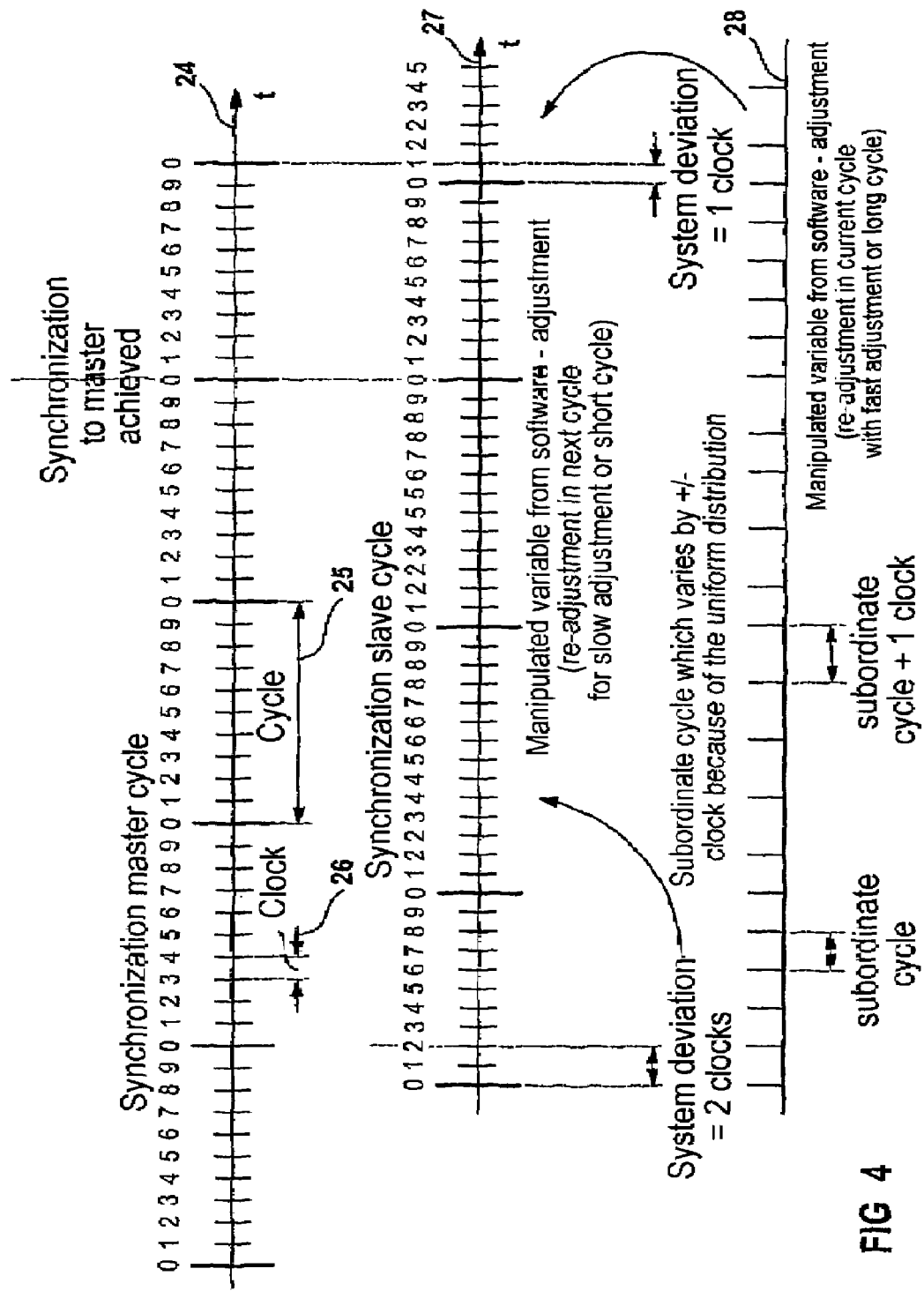

FIG. 4 shows an example for the use of the adjustment method in accordance with the invention. A signal 24 of the synchronization master, i.e. the clock of the clock pulse generator node, is subdivided into cycles 25. In each cycle 25 the timer of the clock pulse generator node counts from 0 to 9, i.e. 10 clocks 26 are generated per cycle 25. This provides the clock pulse generator time base for the synchronization of the communication cycles in the communication system.

The signal 27 belongs to a synchronization slave, i.e. one of the communication nodes of the communication system, for which the time base is to be adjusted for synchronization of its communication cycles. The synchronization slave initially has a system deviation from the cycle of the synchronization master of two clocks. A corresponding manipulated variable is determined from this system deviation. The manipulated variable specifies whether within the next communication cycle this communication cycle must be extended or shortened and by how much the next communication cycle must be changed if necessary.

In the example case considered here the subsequent communication cycle is to be extended by four clocks. This is to be done by repeating every second clock. The corresponding parameters S1 and S2 (cf. FIG. 2) are then S1=2 and S2=0. It is particularly advantageous here that the additional four clocks are not simply appended to this cycle to extend it but are uniformly distributed within the cycle so that the subordinate cycle clock 28 varies at most by +/−one clock. This avoids cycle clock 28 of the communication cycle being extended disproportionately at the end of the communication cycle compared to other communication cycles. The outcome of this is that the subordinate higher frequency cycle clock 28 merely features a jitter of one timer clock within the communication cycle.

The present invention is particularly advantageous in that it allows a distributed software/hardware control of the communication cycle, i.e. of what is referred to as the isochronous cycle, in real time capable network components, particularly Ethernet switches. This makes it possible to dynamically adapt the control algorithms depending on the network characteristics or area of application in the field. In this case the adjustment in the initialization or startup phase of the communication system can be distinguished from the adjustment during operation. Furthermore, because of the uniform distribution of the manipulated variable and the associated adjustment of the time base during a communication cycle subordinate cycles can also be adjusted.

The invention claimed is:

1. A method for operating a first node in a network comprising:
    processing a send list and a receive list during a communication cycle;
    receiving a desired value for a time base of the communication cycle in the first node of the network;
    determining a system deviation from the desired value and an actual value of the time base;
    providing a manipulated variable for providing information for adjusting the time base over multiple clocks of the time base; and
    generating with the manipulated variable, a manipulated value for adjusting the time base corresponding to the system deviation, the desired value sent by a clock pulse generator node of the network by a data telegram to the first node, and the desired value determined by the clock pulse generator node from a reference time base of the clock pulse generator node taking account of the delay time of the data telegram to the first node.

2. A method in accordance with claim 1, wherein a point-to-point connection between the first node and a second node of the network exists during the communication cycle.

3. A method in accordance with claim 1, wherein the network is a switched data network.

4. A method in accordance with claim 1, wherein the first or the second node having a switching matrix for establishing a switched point-to-point connection.

5. A method in accordance with claim 1, wherein the desired value is received from the first node via the network.

6. A method in accordance with claim 1, wherein the manipulate variable is for providing information for adjusting the time base over multiple clock of the time base per communication cycle.

7. A method in accordance with claim 6, wherein the number of clocks for adjusting the length of the communication cycle is uniformly distributed over the current or a subsequent communication cycle.

8. A method in accordance with claim 6, wherein the manipulated variable is based on a first parameter and a second parameter, the first parameter defining the number of clocks, for adjusting the length of the communication cycle, distributed uniformly over a communication cycle and the second parameter defining an amount by which each clock defined by the first parameter is to be adjusted.

9. A method in accordance with claim 1, further comprising:
   providing a first adjustment rule for creating a manipulated variable during an initialization phase;
   providing a second adjustment rule for creating the manipulated variable during operation.

10. A communication system having communication nodes and a clock pulse generator node, one of the communication nodes comprising:
   a send list and a receive list for processing during a communication cycle;
   a device for receiving a desired value for a time base of the communication cycle of the communication node of a communication connection with a further communication node of the network;
   a device for determining a system deviation from the desired value and an actual value of the time base;
   a device for providing a manipulated variable for providing information for adjusting the time base over multiple clocks of the time base and for generating, with the manipulated variable, a manipulated value for adjusting the time base corresponding to the system deviation,
   wherein the clock pulse generator node includes a device for sending a data telegram with the desired value to a relevant communication node, and the desired value is determined from an actual value of a clock pulse generator base and a delay time of the data telegram from the clock pulse generator node to the relevant communication node,
   wherein the network established point-to-point connections is synchronized communication cycles.

11. A communication system in accordance with claim 10, wherein the communication connection is a point-to-point connection.

12. A communication system in accordance with claim 10 configured for receiving or sending realtime data via the communication connection.

13. A communication system in accordance with claim 10, wherein the device for generating a manipulated value provides that the adjustment of the time base is distributed uniformly over a communication cycle.

14. A communication system in accordance with claim 10, wherein the device for generating a manipulated variable is adapted to generate a first parameter and a second parameter of the manipulated variable, the first parameter defining a number of clocks of the time base and the second parameter defining whether the clocks defined by the first parameter are to be repeated or not executed.

15. A communication system in accordance with claim 10, wherein the communication system is used in an automation system.

16. A method in accordance with claim 1, wherein the network is a realtime Ethernet network.

17. A method in accordance with claim 2, wherein the network is a switched data network.

18. A method in accordance with claim 2, wherein the first or the second node has a switching matrix for establishing a switched point-to-point connection.

19. A communication system in accordance with claim 10, wherein the communication connection is a switched data network.

* * * * *